(12) United States Patent
Bengi et al.

(10) Patent No.: US 7,296,062 B2
(45) Date of Patent: Nov. 13, 2007

(54) METHOD FOR GENERATING A PRESENTATION FOR RE-LOCATING AN INFORMATION PAGE THAT HAS ALREADY BEEN CALLED

(75) Inventors: Ali Nejat Bengi, Erlangen (DE); Rainer Kuth, Herzogenaurach (DE)

(73) Assignee: Siemens Aktiengesellschaft, Munich (DE)

( * ) Notice: Subject to any disclaimer, the term of this patent is extended or adjusted under 35 U.S.C. 154(b) by 714 days.

(21) Appl. No.: 10/108,595

(22) Filed: Mar. 28, 2002

(65) Prior Publication Data

US 2002/0143895 A1 Oct. 3, 2002

(30) Foreign Application Priority Data

Mar. 30, 2001 (DE) ............................. 101 15 895

(51) Int. Cl.
G06F 15/16 (2006.01)

(52) U.S. Cl. ............... 709/217; 709/203; 709/218; 709/219; 715/736; 715/737; 715/738

(58) Field of Classification Search ........ 709/217–219, 709/227, 249, 203; 715/760, 833, 853–855, 715/974, 736–738; 345/760, 738; 713/151; 725/37

See application file for complete search history.

(56) References Cited

U.S. PATENT DOCUMENTS

| | | | | |
|---|---|---|---|---|
| 5,784,058 A | | 7/1998 | LaStrange et al. | 715/738 |
| 5,935,207 A | * | 8/1999 | Logue et al. | 709/219 |
| 6,011,537 A | * | 1/2000 | Slotznick | 715/733 |
| 6,018,344 A | * | 1/2000 | Harada et al. | 715/818 |
| 6,035,330 A | * | 3/2000 | Astiz et al. | 709/218 |
| 6,144,962 A | * | 11/2000 | Weinberg et al. | 707/10 |
| 6,189,024 B1 | * | 2/2001 | Bauersfeld et al. | 709/203 |
| 6,314,386 B1 | * | 11/2001 | Uemura | 702/186 |
| 6,633,316 B1 | * | 10/2003 | Maddalozzo et al. | 715/854 |
| 6,667,751 B1 | * | 12/2003 | Wynn et al. | 715/833 |
| 2001/0034646 A1 | * | 10/2001 | Hoyt et al. | 705/14 |
| 2002/0062323 A1 | * | 5/2002 | Takatori et al. | 707/514 |

(Continued)

FOREIGN PATENT DOCUMENTS

DE 199 60 043 12/1999

(Continued)

OTHER PUBLICATIONS

"A Comprehensive Strategy fo Using Web Site Statistics", Carlton Lovegrove, Mar. 25, 2005.*

(Continued)

Primary Examiner—Thu Ha Nguyen
(74) Attorney, Agent, or Firm—Schiff Hardin LLP

(57) ABSTRACT

In a method for generating a presentation for re-locating an information page that was already called proceeding from a home page of an information vendor, and which has been exited in the meantime, the home page being able to be called via the Internet, and an intranet or an extranet, the user is registered when the home page is called. Further, the information pages of the information vendor called by the user directly and indirectly proceeding from the home page are registered; and set up on the home page, and a displayable presentation is generated from which the sequence of the information pages of the information vendor called by the user can be recognized.

6 Claims, 4 Drawing Sheets

U.S. PATENT DOCUMENTS

| | | | |
|---|---|---|---|
| 2002/0099936 A1* | 7/2002 | Kou et al. | 713/151 |
| 2002/0111922 A1* | 8/2002 | Young et al. | 705/80 |
| 2002/0127530 A1* | 9/2002 | Weakly | 434/350 |
| 2002/0128935 A1* | 9/2002 | White et al. | 705/27 |
| 2003/0005041 A1* | 1/2003 | Ullmann et al. | 709/203 |
| 2004/0010546 A1* | 1/2004 | Klug et al. | 709/203 |
| 2004/0012630 A1* | 1/2004 | Carels et al. | 345/760 |
| 2004/0088355 A1* | 5/2004 | Hagan et al. | 709/203 |
| 2004/0233235 A1* | 11/2004 | Rubin et al. | 345/738 |

FOREIGN PATENT DOCUMENTS

| | | |
|---|---|---|
| EP | 1168204 A2 * | 2/2002 |
| JP | 2003-330789 A * | 11/2003 |
| WO | WO 00/75827 | 12/2000 |

OTHER PUBLICATIONS

"The Amateur Webmaster: The wisdom in Log files", Vikas Kamat, Apr. 15, 2001.*

"Access logs and statistics about your site activity", www.ucsi.cc/hosting/stats.html, Feb. 4, 2005.*

* cited by examiner

METHOD FOR GENERATING A PRESENTATION FOR RE-LOCATING AN INFORMATION PAGE THAT HAS ALREADY BEEN CALLED

BACKGROUND OF THE INVENTION

1. Field of the Invention

The present invention is directed to generating a presentation for re-locating an information page that has already been called proceeding from an information vendor, and which has been exited in the meantime.

2. Description of the Prior Art

"Surfing", for example on the Internet, means the time-successive calling of different Internet pages via hyperlinks. The problem often occurs that, after an Internet page has been called and then exited, at some later time one would like to locate that Internet page again i.e., to call it again. Standard network browsers, which are meant to include computer programs that run on computers, for example PCs, that enable surfing in the Internet, offer only limited possibilities for re-locating an Internet page that was previously called. Most network browsers, for example the Internet Explorer of Microsoft Corporation or the program Netscape of Netscape Communications Corporation, offer a "back" button in order, proceeding from the currently called Internet page, to proceed to the Internet page called immediately before. As used herein, an Internet page means the information that can be called under an Internet address with the assistance of a network browser, independently of the scope of the information.

There is also the possibility of calling an address list that contains a number of called addresses of Internet pages. The address list, however, usually does not include any addresses of Internet pages called with links proceeding from a home page. An address of an Internet page that is not explicitly recognizable is thereby hidden behind such a link that, for example, is identified by a line under a word. By activating the link with a computer mouse, for example, by moving a pointer adjustable with the computer mouse onto the link and actuating a key of the computer mouse, one thereby proceeds into the corresponding Internet page.

Particularly after surfing for a longer time in the Internet, the "back" button and the address list are only conditionally suited for re-locating an Internet page that has already been found, particularly when it is an Internet page from the informational offering of an information vendor that branches off from a home page, since the address of the Internet page to be re-located either cannot be located again for the above reasons or no longer can be found in the address page because it was already deleted. The same is true, moreover, for surfing in an intranet or extranet with a browser.

PCT Application WO 00/75827 discloses a method with which the behavior of a person when surfing the Internet is analyzed with an Internet browser implemented on a computer. Whenever the person with the Internet browser requests an Internet page from an Internet server, the status of the Internet browser is registered and data about Internet pages that have been called are acquired.

European Application 0 810 536 discloses a method wherein the user of an Internet browser can decide on a display device before the display of an Internet page, that was newly requested with the Internet browser from an Internet server, as to whether an additional window should be opened for the display of the newly requested Internet page, so that a page already displayed with the Internet browser continues to be displayed and is not masked by the newly requested Internet page to be displayed.

German OS 199 60 043 discloses a method implementable proceeding from a computer system for navigating within a tree structure having leaf nodes that represent arbitrary, inter-related data treated as a unit.

SUMMARY OF THE INVENTION

An object of the present invention is based to provide a method of the type described which allows an information page that has already been called from the information offering of an information vendor, directly or indirectly proceeding from a home page of the information vendor, and which has then neem exited, be re-located in a simple way, and thus called again.

According to the invention, this object is achieved in a method for generating a presentation for the re-location of an information page that was already called proceeding from a home page of an information vendor, and which has been exited in the meantime, wherein the page can be called via the Internet, an intranet or an extranet, including the steps of registering a user when the home page is called; registering the information pages of the information vendor called by the user directly and indirectly proceeding from the home page; and generating a displayable presentation from which the sequence of the information pages of the information vendor called by the user can be recognized.

In accordance with the invention, thus, an optionally displayable presentation can be generated from which the user can derive his or her path when surfing through the information offering of the information vendor, or from which the user can, in particular, derive the information pages of the information vendor called indirectly or directly by the user from a home page that, for example, is the home page of an information vendor in the Internet. Thus the user, in a simple way, can identify an information page already called from the information offering of the information vendor, whether it is an Internet page, an intranet page or an extranet page that the user has already left and would like to call again.

In a preferred embodiment of the invention, the presentation is based on contents of the home page, with the sequence of the called information pages being graphically characterized in the presentation. In a version of the invention, the sequence of the information pages called by the user can be identified in an especially simple way when the sequence is characterized with arrows.

In another version of the invention the sequence of the called information pages is characterized with numbers. In this way as well, the user can comfortably identify the sequence of the information pages the user has already called and can proceed back to a desired information page that has already been called.

In another version of the invention the presentation is only temporarily generated and, accordingly, is available for only a certain time, in order to reduce the memory outlay of data for the service, facilitating re-locating of an information page already called, given a number of users who called the home page of an information vendor. The length of time an information vendor makes the presentation pertaining to a specific user for re-locating an already found information page is left up to the information vendor.

In another embodiment of the invention, the presentation of the already called information page includes descriptions of the contents of the called information pages in clear text, i.e. the presentation mainly has particulars about the informational content of the corresponding information pages. The presentation thus is not a mere reproduction of addresses of called information pages, which often does not offer any information that can be of value to the user.

In another embodiment of the invention, the presentation can include at least two displayable levels, whereby the first level of the presentation is set up at the home page, and the second level of the presentation is set up at a branch page that can be called proceeding from the home page and likewise offers at least one callable information page, whereby the branching into the second level can be recognized in the first level. This embodiment of the invention takes the multitude of information made available by an information vendor into consideration when a number of alternatives of callable information pages are likewise available from branch pages that can be called proceeding from the home page. In this way, the user in a simple way can get an overview in a simple way about the information pages, callable from branch pages, that the user has already called, in order to re-locate an information page that the user already called and would like to call again.

DESCRIPTION OF THE PREFERRED EMBODIMENTS

Figure 1:
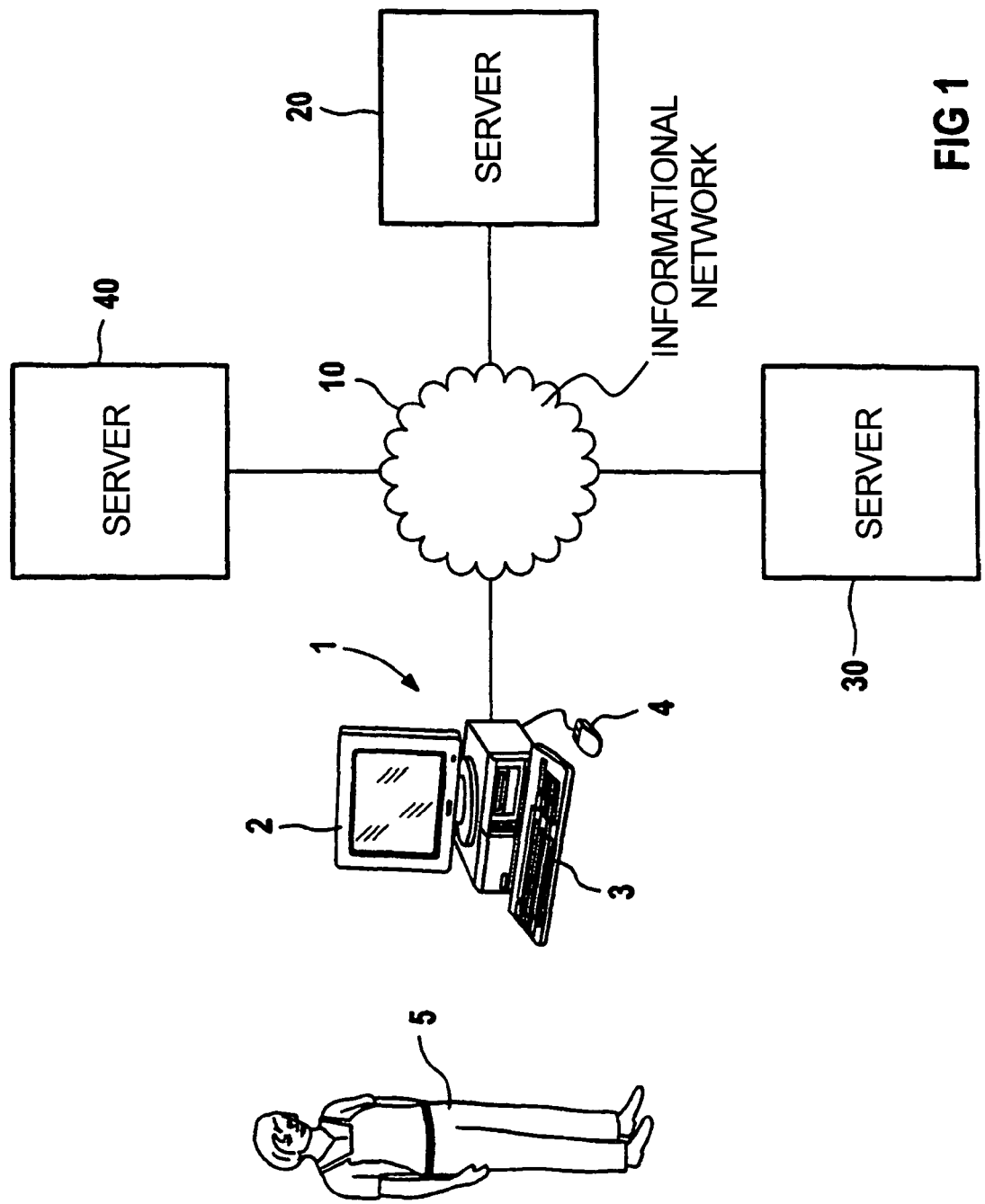
FIG. 1 illustrates an arrangement for communication via the Internet.

As an example, FIG. 1 shows an arrangement for a communication via the Internet. Using a computer 1 that has a display device 2, a keyboard 3 and a computer mouse 4 in a known way, and with a suitable computer program running on the computer 1, for example a browser in the form of Internet Explorer of Microsoft Corporation or the Netscape program of Netscape Communications Corporation, a user 5 can browse an informational network 10, such as the Internet. After entering an Internet address, the user 5 can access various information pages in the form of Internet pages that are made available servers 20, 30, 40.

The Internet is a worldwide, decentralized network that connects individual regional and local networks in the entire world to one another. The Internet is characterized by a uniform addressing structure in the form of the URL addresses (Uniform Resource Locator). For data transmission in the Internet, it is mainly the TCP/IP (Transport Control Protocol/Internet Protocol) that is employed. The WWW (World Wide Web) is a hypertext-based information service in the Internet. The HTTP (Hypertext Transfer Protocol) is employed in the WWW, information being transmittable therewith as HTML documents (Hypertext Markup Language). The WWW essentially has a client-service structure. i.e., typical functionalities are based on a dialog-like information exchange between the client and at least one server. A server is a computer that offers information of an information vendor in the network in the form of data inventories, programs or services for users. For example, a web page or home page designed as an HTML document is stored at a server, and can be called therefrom via the network from anywhere. The entity is referred to as a client within the client-server structure is the computer that is employed by a user in order to exchange data with the server. As already mentioned, the user makes use of a browser implementable on the client computer for this purpose. A browser is a program with which an HTML document can be loaded from a server and displayed at the client computer. In the simplest case, formatted hypertext is displayed; an expansion, graphics sound effects and applets are added thereto, among other things. These are embedded into the HTML document. To this end, however, the browser must appropriately support the expansions.

When calling an Internet address of an information vendor with his computer 1, the user 5 usually first proceeds to a home page on which initial information is already offered and proceeding from information pages containing further information can be called.

Figure 2:
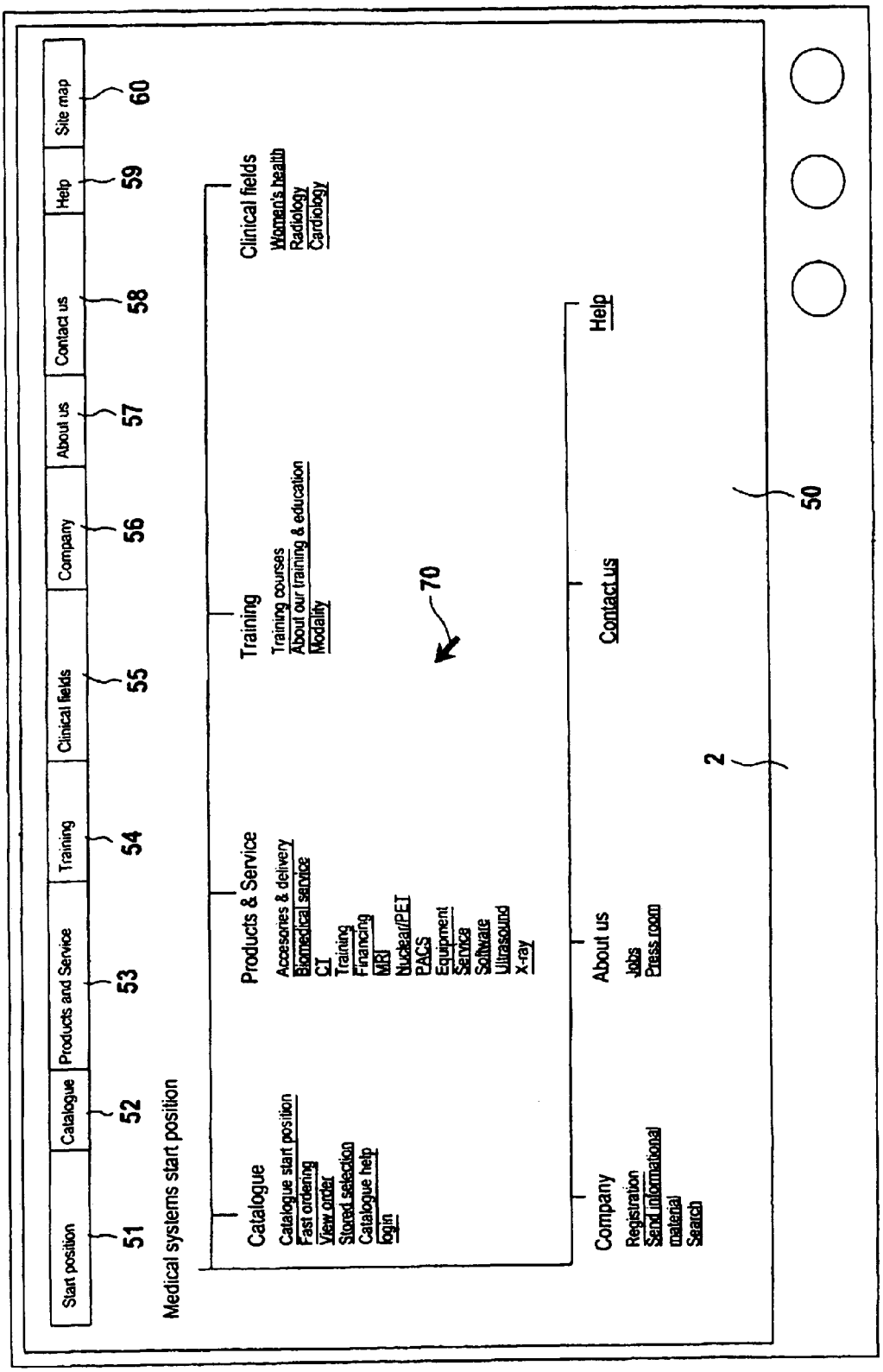
FIG. 2 shows a home page of an information vendor made available on a service.

In the exemplary embodiment, the user 5 has called the home page 50 of an information vendor shown in FIG. 2 and made available on the server 20. Further Internet pages established by the information vendor being able to be called proceeding therefrom via links. A link, which designates a callable Internet page, can be recognized in the exemplary embodiment by underlining beneath a word that indicates the information that is present on this Internet page. Moreover, the activatable buttons 51 through 59 designate links to Internet pages of the information vendor. By activating a link, for example by the user 5 moving the arrow 70 schematically indicated in FIG. 2 onto the corresponding link with the computer mouse and activating it by actuating a key (not shown) of the computer mouse 4, the user 5 proceeds into the corresponding Internet page, on which further links to other Internet pages can be offered.

In order to inventively enable, in a simple way, the re-locating of an Internet page of an information vendor that has already been called while searching through Internet pages of the information vendor, registration software running on the server 20 in the exemplary embodiment registers every user who calls the home page 50 of the information vendor. This registration ensues on the basis of a cookie.

A cookie is an information packet that a server supplies for storage on the client computer when a web page stored on the server is called at a browser running on a client computer. Given every access of the aforementioned client computer onto the web page, the browser can deliver the stored cookie to the server. Cookies can contain nearly arbitrary information. Among other things, statistical data about a client computer can be acquired with the cookie technique. When a web page receives the cookie that it set at an earlier point in time back from the client computer, then a renewed recognition of the client computer ensues. Further, it can be recognized on the basis of the cookie technique whether and how a specific client computer visits specific web pages anew and/or in which sequence. Among other things, marketing measures can be implemented therefrom. Since only the client computer is identified, the user initially remains anonymous. Only when the user himself or herself communicates personal data to the web page, for example in the form of an e-mail address, a customer number and/or credit card number, can such personal data be included into cookies of this web page. The result is that the user—the next time the user calls that web page—is also automatically presented with his or her personal data and can be identified by that data.

Via the cookie, the registration software running on the server 20 can thus register the computer 1, and thus indirectly register the user 5, when calling the home page 50 of the information vendor. Subsequently, all Internet pages (or their addresses) of the information vendor called by the user 5 or by the user's computer 1 are registered. In this way, the sequence of the Internet pages of the information vendor called by the user 5 can be determined with the registration software and can be graphically illustrated in a presentation. In the exemplary embodiment, user 5 can activate the button "site map" 60 that is present on each Internet page of the information vendor with the computer mouse 4 when, for example following longer surfing, the user would like to re-locate an Internet page of the information vendor that the user had already called and exited in the meantime. This causes a window to be opened on the display device 2 of the user 5 wherein a presentation is shown to the user 5 from which the sequence of the Internet pages of the information vendor called by the user 5 can be recognized.

Figure 3:
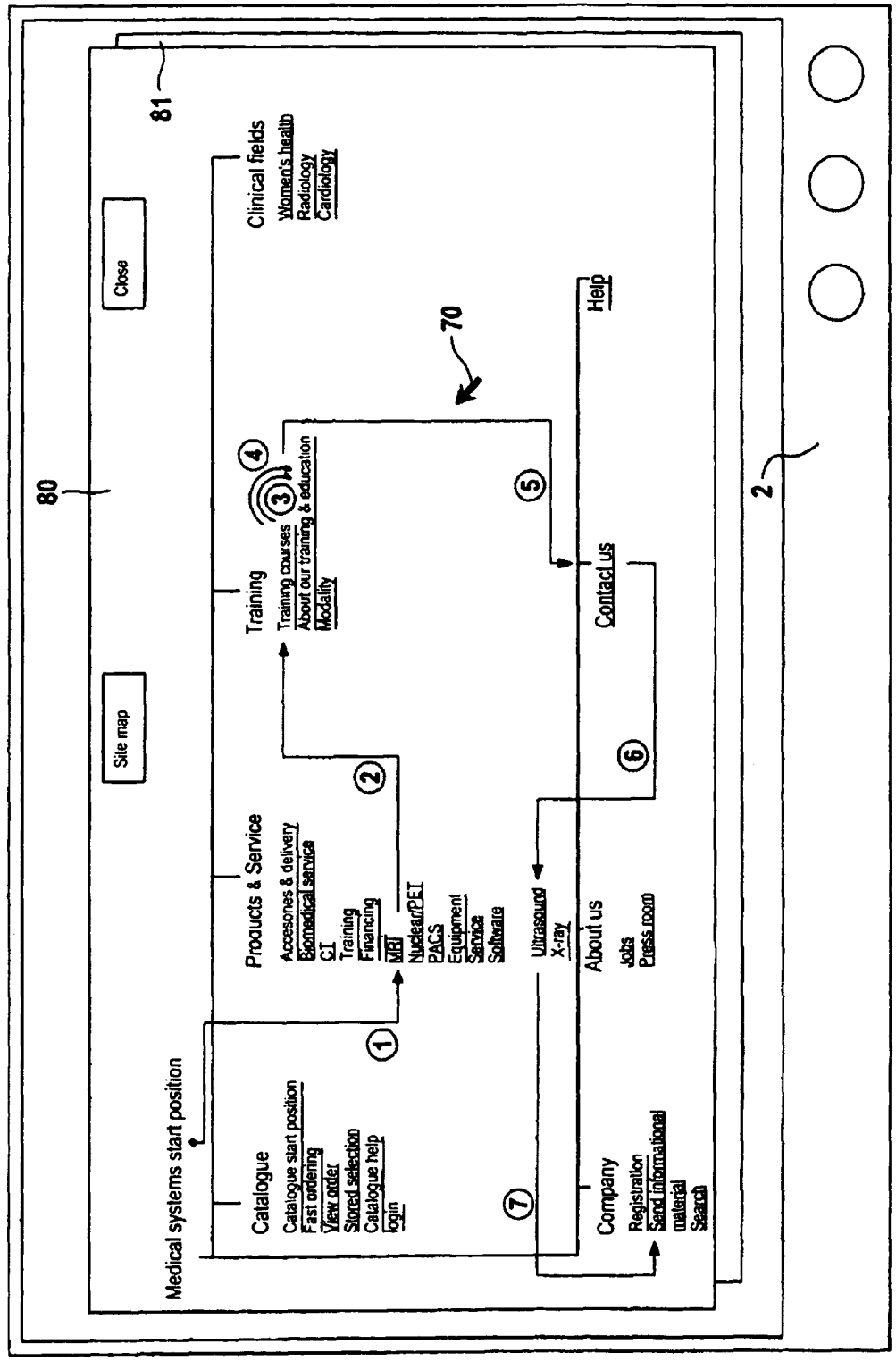
FIGS. 3 and 4 show an inventive presentation with two levels from which the sequence of successively called Internet pages of an information vendor can be recognized.
Figure 4:
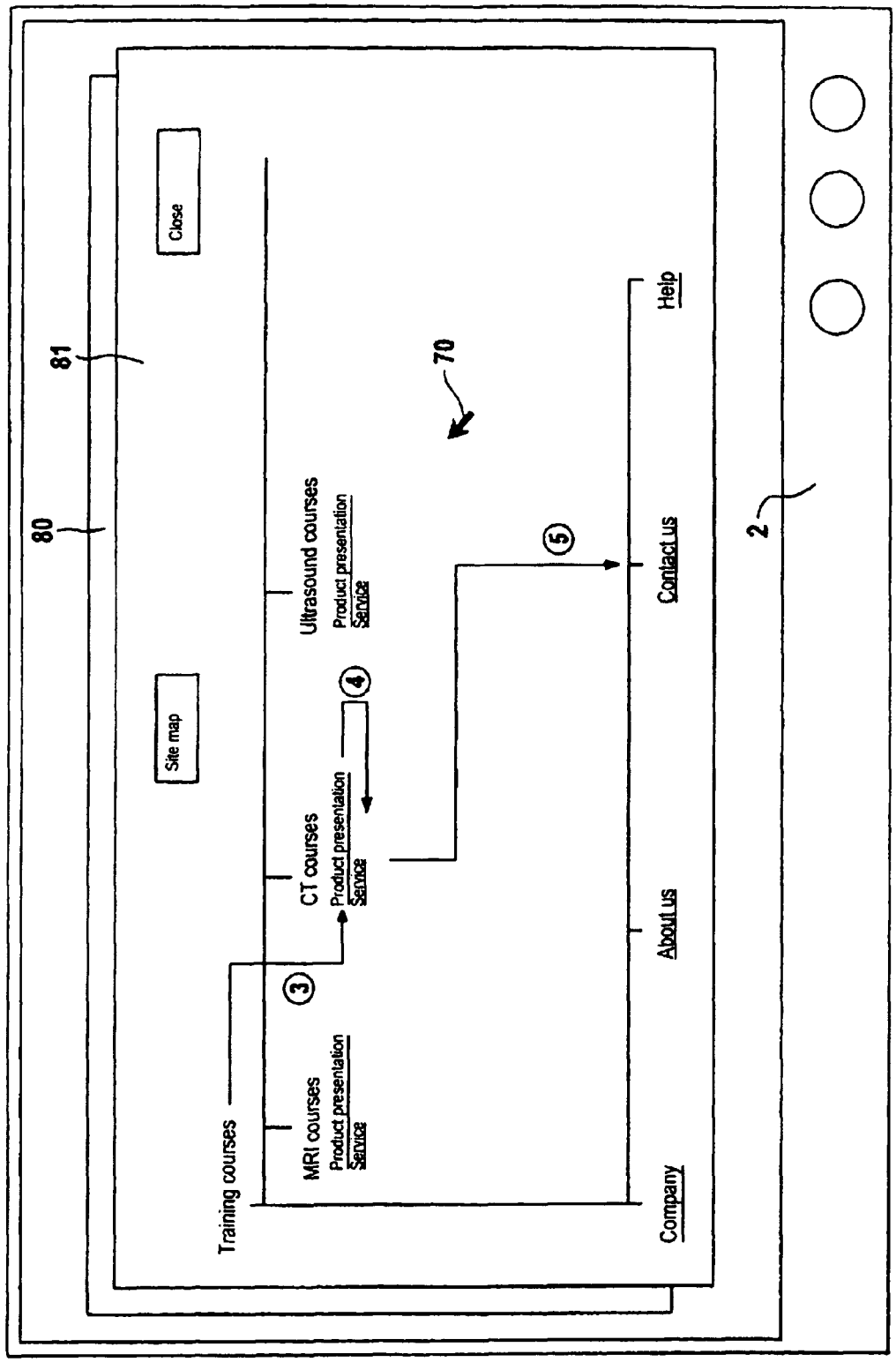

FIGS. 3 and 4 show a presentation of this type that has two levels in the exemplary embodiment, i.e. two windows 80 and 81. The presentation is based on the home page 50 or on a branch page (not shown) of the information vendor and is merely an image of the home page 50 or of the branch page. The sequence of the Internet pages of the information vendor called by the user 5 can be graphically seen in the windows 80 and 81 with arrows. The sequence in the exemplary embodiment is additionally identified by numbers, but this need not necessarily be the case. The sequence can also be characterized only with numbers or only with arrows or with some other kind of graphic identification. In the exemplary embodiment, the words shown in the presentation are a link that can be activated, so that the user can immediately proceed to the Internet page he or she is seeking. In the illustrated sequence of the called Internet page, only clear text designations and no Internet addresses are employed, so that the user, on the basis of the word, can already make conclusions about the content of the Internet page hidden behind the link characterized with the word.

As an example, it can be seen from the window 80 on the basis of the arrows of steps 3 and 4 allocated to the link "training courses" that the link "training courses" designates an Internet page that offers further alternatives of callable Internet pages, i.e. is a branch page from which the user 5 proceeded to further Internet pages during surfing by activating links. In the exemplary embodiment, the user 5, as can be seen from the window 80, called the Internet page "training course" in step 2 and, proceeding from this Internet page, called further Internet pages branching off from this Internet page in steps 3 and 4. When the user moves the arrow 70 onto the window 81 and activates the window by actuating a key of the computer mouse 4, then the window 81 is displaced in front of the window 80. The user, accordingly, has proceeded into the second level of the presentation that sets up on the Internet page "training courses", and wherein the sequence (steps 3 and 4) of the Internet pages called by the user 5 and branching off from the branch page can be recognized.

By actuating the button "site map" 60, the user 5 can call a presentation which may include a number of levels in the form of windows, on the basis of which the user 5 can unproblematically track his or her route through called Internet pages of an information vendor in order to identify an Internet page that has already been called and in order to be able to intentionally call this again.

By activating the button "closed", that is displayed both in the window 80 as well as in the window 81, the user 5 can leave the site map.

Preferably, the presentations are only temporarily generated, i.e. the presentation or the content thereof is a type of temporarily generated bookmark that is deleted after the user has ended his information session with the information vendor.

The invention has been described above for a communication via the Internet. The invention, however, also can be employed for a communication within, for example, a company-internal intranet or an extranet, which means an interconnection of at least two intranets. The network 10 thus can represent an intranet or an extranet. The described data transfer as well as the described generation of the presentation remain unaffected as a result.

Although modifications and changes may be suggested by those skilled in the art, it is in the intention of the inventors to embody within the patent warranted hereon all changes and modifications as reasonably and properly come within the scope of their contribution to the art.

We claim as our invention:

1. A method for generating a presentation for re-locating an information page that has been called, via a network selected from the group consisting of the Internet, an intranet, and an extranet, from a home page of an information vendor having a vendor server and which has subsequently been exited, comprising the steps of:
   when a user, via a user computer in communication with said vendor server, calls a home page, comprising home page contents, of an information vendor, registering said user at said vendor server;
   at said vendor server registering information pages of said information vendor called by said user directly and indirectly proceeding from said home page; and
   at said vendor server only temporarily generating a displayable presentation, for display at said user computer which visually identifies a sequence of said information pages of said information vendor called by said user, and deleting said presentation from said vendor server, with no storage of said presentation or said information pages at said vendor server, when said user exits an information session with said information vendor.

2. A method as claimed in claim 1 wherein the step of generating said displayable presentation comprises setting up said displayable presentation on the contents of said home page, with said sequence being graphically identified.

3. A method as claimed in claim 2 comprising graphically identifying said sequence with arrows.

4. A method as claimed in claim 2 comprising graphically identifying said sequence with numbers.

5. A method as claimed in claim 1 comprising including plain text descriptions of the respective contents of the called information pages in said presentation.

6. A method as claimed in claim 1 wherein said presentation comprises at least two displayable levels, and wherein the step of generating said displayable presentation comprises setting up a first of said displayable levels at said home page, and setting up a second of said levels at a branch page that can be called proceeding from said home page and which offers at least one information page that can be called, and including a visual identification in said first of said displayable levels that branching into said second of said levels has occurred.

* * * * *